United States Patent
Myers, Jr.

(10) Patent No.: US 6,644,009 B2
(45) Date of Patent: Nov. 11, 2003

(54) METHODS AND APPARATUS FOR OPERATING GAS TURBINE ENGINES

(75) Inventor: William J. Myers, Jr., West Chester, OH (US)

(73) Assignee: General Electric Co., Schenectady, NY (US)

(*) Notice: Subject to any disclaimer, the term of this patent is extended or adjusted under 35 U.S.C. 154(b) by 96 days.

(21) Appl. No.: 10/026,191

(22) Filed: Dec. 20, 2001

(65) Prior Publication Data

US 2003/0115883 A1 Jun. 26, 2003

(51) Int. Cl.[7] .................................................. F02C 9/28
(52) U.S. Cl. .................................. 60/39.091; 60/39.281
(58) Field of Search ........................ 60/39.091, 39.093, 60/39.281

(56) References Cited

U.S. PATENT DOCUMENTS

| | | | |
|---|---|---|---|
| 4,328,666 A | | 5/1982 | Cummins, Jr. |
| 4,783,026 A | | 11/1988 | Rumford et al. |
| 4,831,819 A | | 5/1989 | Norris et al. |
| 5,265,414 A | * | 11/1993 | Mouton ................... 60/39.091 |
| 5,471,831 A | * | 12/1995 | Rowe ...................... 60/39.091 |
| 5,596,130 A | | 1/1997 | Wright et al. |
| 5,621,154 A | | 4/1997 | Wright et al. |
| 5,622,045 A | | 4/1997 | Weimer et al. |
| 5,755,090 A | * | 5/1998 | Hu .......................... 60/39.091 |
| 6,250,061 B1 | | 6/2001 | Orlando |

* cited by examiner

Primary Examiner—Louis J. Casaregola
(74) Attorney, Agent, or Firm—William Scott Andes; Armstrong Teasdale LLP; Robert B. Reeser, III

(57) ABSTRACT

A method for controlling an aircraft engine using a control system enables an engine to be operated at low power while hail is ingested. The control system includes a processor coupled to the aircraft engine. The method comprises receiving a plurality of sensed inputs from the aircraft engine, receiving current engine environmental operating conditions, determining a reference value for a controlled variable from a fuel flow schedule, generating a fuel-air-ratio for the reference value based on current engine environmental operating conditions, and enriching combustor fuel staging in response to the fuel-air-ratio.

12 Claims, 4 Drawing Sheets

Hail Ingestion with 20% Combustor Air Burning

METHODS AND APPARATUS FOR OPERATING GAS TURBINE ENGINES

BACKGROUND OF THE INVENTION

This invention relates generally to gas turbine engines, and more particularly, to methods and apparatus for operating gas turbine engines.

Gas turbine engines typically include high and low pressure compressors, a combustor, and at least one turbine. The compressors compress air that is mixed with fuel and channeled to the combustor. The mixture is then ignited for generating hot combustion gases, and the combustion gases are channeled to the turbine which extracts energy from the combustion gases for powering the compressor, as well as producing useful work to propel an aircraft in flight or to power a load, such as an electrical generator.

Because gas turbine engines must be capable of operating in a variety of operating conditions, the engines include control systems to control fuel flow during engine operations. More specifically, the control systems compare inputs received from engine parameters, such as rotational speed of a fan, to power management schedules preloaded in the control systems.

When engines operate in hail conditions, hail may be undesirably ingested into the engine core and passed through to the combustor. Over time, continued operation of the engine with significant hail ingestion within the combustor, may cause the combustor to flame-out. More specifically, at least some known aircraft engines are susceptible to flame-outs and/or rollbacks when hail is encountered and ingested at low engine power operating conditions, such as idle descent. To facilitate reducing problems associated with hail ingestion, at least some known engines include a variable bypass valve (VBV) system. VBV systems are designed to extract a substantial portion of hail ingested in an engine core and centrifuge it into the engine bypass stream. However, such VBV systems are complex, may provide only limited benefits, and may increase an overall assembly cost of the engine.

BRIEF SUMMARY OF THE INVENTION

In one aspect of the invention, a method for controlling an aircraft engine using a control system is provided. The control system includes a processor coupled to the aircraft engine. The method comprises receiving a compressor discharge pressure from the aircraft engine, receiving current engine environmental operating conditions, determining a reference value for a controlled variable from a fuel flow schedule, generating a fuel-air-ratio for the reference value based on current engine environmental operating conditions, and enriching combustor fuel staging in response to the fuel-air-ratio.

In another aspect, a control system for controlling an aircraft engine is provided. The control system is coupled to the aircraft engine for receiving a plurality of reference inputs from engine sensors coupled to the engine, including at least one input indicative of engine environmental operating conditions. The control system is configured to produce a commanded fuel flow in response to engine environmental operating conditions and the engine sensor values.

In a further aspect of the invention, an aircraft engine fuel control system is provided. The system is coupled to the aircraft engine to receive reference inputs from the engine to determine a state of the aircraft engine including at least one input indicative of engine hail ingestion. The system is configured to enrich combustor fuel staging in response to engine hail ingestion and the engine sensor values.

DETAILED DESCRIPTION OF THE INVENTION

Figure 1:
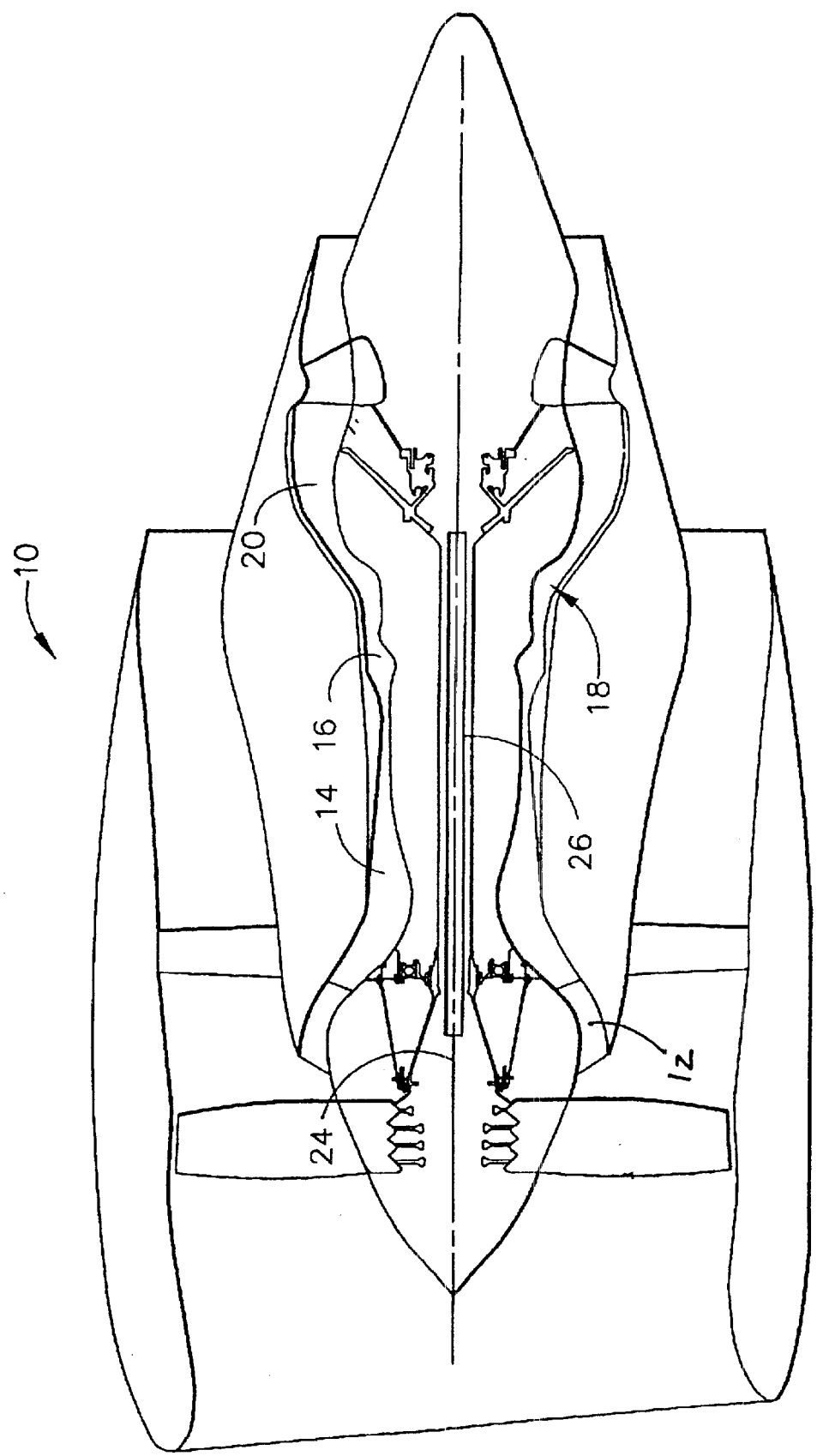
FIG. 1 is schematic illustration of a gas turbine engine.

FIG. 1 is a schematic illustration of a gas turbine engine 10 including a low-pressure compressor 12, a high-pressure compressor 14, and a combustor 16. Engine 10 also includes a high-pressure turbine 18, and a low-pressure turbine 20. Compressor 12 and turbine 20 are coupled by a first rotor shaft 24, and compressor 14 and turbine 18 are coupled by a second rotor shaft 26. In one embodiment, engine 10 is a GE90 engine available from General Electric Aircraft Engines, Cincinnati, Ohio.

In operation, air flows through low pressure compressor 12 and compressed air is supplied from low pressure compressor 12 to high pressure compressor 14. Compressed air is then delivered to combustor 16 and airflow from combustor 16 drives turbines 18 and 20.

Figure 2:
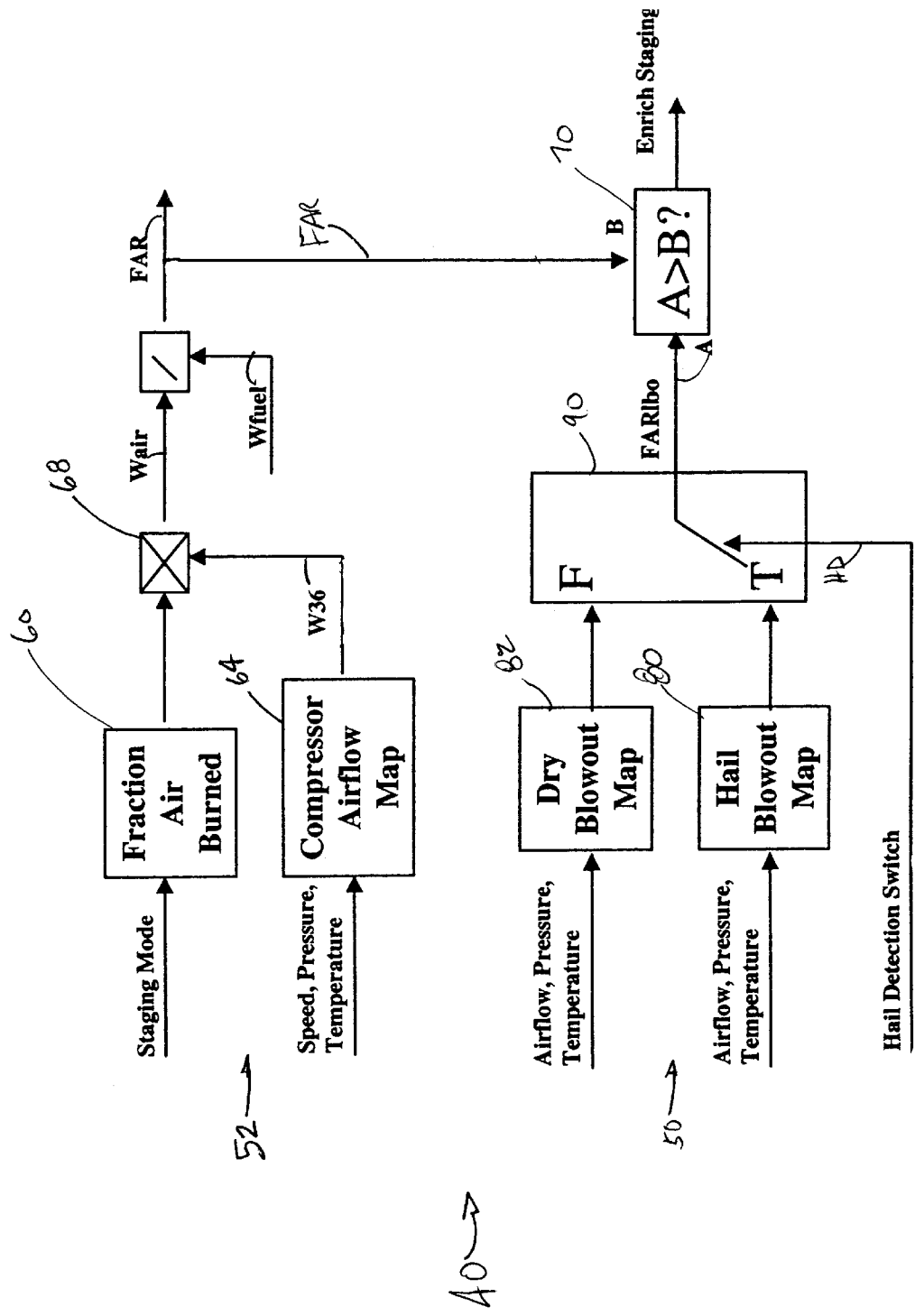
FIG. 2 is a logic diagram of a fuel control system for use with an aircraft engine.

FIG. 2 is a logic diagram of a fuel control system 40 for use with an aircraft engine, such as, aircraft engine 10 shown in FIG. 1. Fuel control system 40 includes logic that facilitates enhanced combustor flameout margin when the engine is operating in potential hail conditions. More specifically, fuel control system 40 facilitates enhanced combustor operating conditions when the engine is operating in and ingesting hail. Furthermore, fuel control system 40 facilitates reducing combustor flame-outs and/or roll-backs when a reduced fuel schedule is used for engine operating conditions, such as, but not limited to conditions prevalent during idle descent. Fuel control system 40 is coupled to a processor-based engine control system. The term processor, as used herein, refers to microprocessors, application specific integrated circuits (ASIC), logic circuits, and any other circuit or processor capable of executing fuel control system 40 as described herein.

The engine includes a core engine portion (not shown), a plurality of sensors (not shown) that are responsive to engine operations, and a plurality of environmental sensors (not shown) for sensing environmental conditions, such as, but not limited to, ambient air temperature and altitude. The engine also includes a hail detection switch (not shown) which provides a signal HD indicative of hail ingestion to control system 40. In an alternative embodiment, the engine includes a software switch utilized to indicate hail ingestion. Fuel control system 40 alters fuel staging to the combustor based on the inputs received from the environmental sensors, the aircraft engine sensors, and signal HD. More specifically the fuel control turns off fuel flow to a portion of the combustion zone while simultaneously increasing fuel flow to the remainder of the combustion zone. The result is a local increase in fuel/air ratio to support flame stabilization in the presence of hail.

Fuel control system 40 utilizes prediction logic 50 and calculation logic 52. Using calculation logic 52, fuel control system 40 determines a fraction of air burned 60 within the combustor by utilizing a reference staging mode signal received from the engine. Additionally, fuel control system 40 maps compressor airflow 64 by utilizing engine inputs indicative of core rotor speed, combustor airflow pressure, and compressor inlet temperature of the engine, to generate a signal W36 indicative of an amount of airflow exiting the compressor and entering the combustor.

The fraction of air burned 60 is multiplied at a multiplier 68 by signal W36. Multiplying the fraction of air burned 60 within the combustor by the amount of airflow exiting the compressor W36, produces a signal Wair that is indicative of an amount of air that is mixed/burned in the combustor. The amount of fuel mixed/burned in the combustor is divided by an amount of air mixed/burned in the combustor to determine an actual fuel-air-ratio FAR, represented by signal B, for the current engine operating conditions. The current fuel-air-ratio FAR is utilized by the processor-based engine control system and establishes a preferred mode of fuel staging and operation during normal engine operations. Within staged combustion systems, a local fuel-air-ratio may be controlled by increasing or decreasing an amount of fuel flow to the combustor, or alternatively, by varying which locations of the combustor receive fuel. The current fuel-air-ratio, signal B, is input to a comparator 70 where it is compared to a predicted signal A generated by prediction logic 50.

Prediction logic 50 determines a predicted fuel-air-ratio FARlbo by utilizing alternative blowout curves and reference signals received from the engine. More specifically, fuel control system 40 determines a hail blowout map 80 by utilizing engine inputs that are indicative of airflow pressure and temperature, to generate a signal T. Furthermore, fuel control system 40 also determines a dry blowout map 82 by utilizing engine inputs indicative of airflow pressure and temperature, to generate a signal F.

A schedule 90 of predicted fuel-air-ratios at which the combustor will experience a flameout are provided as a reference for use by fuel control system 40. The predicted fuel-air-ratio FARlbo for combustor flameout is generated as a function of dry blowout map signal F and hail blowout map signal T, and is input to comparator 70. Comparator 70 compares the signal B, or the actual fuel-air-ratio for the current operating conditions to signal A, or the predicted fuel-air-ratio for combustor flameout based on the current engine operating conditions. If the predicted value is greater than the actual value, fuel control system outputs a signal to enrich the combustor fuel staging.

During use, when hail is detected by the hail detection switch, fuel control system 40 switches to an alternative set of blowout curves to establish the preferred mode of operation. This alternative set of curves characterizes the combustor's operability in the presence of hail. As a result, when hail is detected, fuel control system 40 alters the combustors mode of operation by enriching fuel staging to facilitate preventing flameouts or rollbacks. Furthermore, fuel control system 40 facilitates an engine idle speed being set at a lower speed than would otherwise be required without the use of fuel control system 40. As a result of fuel control system 40, the engine may be operated with a simplified variable bypass valve system. In alternative embodiments, fuel control system enables the engine to be operated without the inclusion of a variable bypass valve system.

Figure 3:
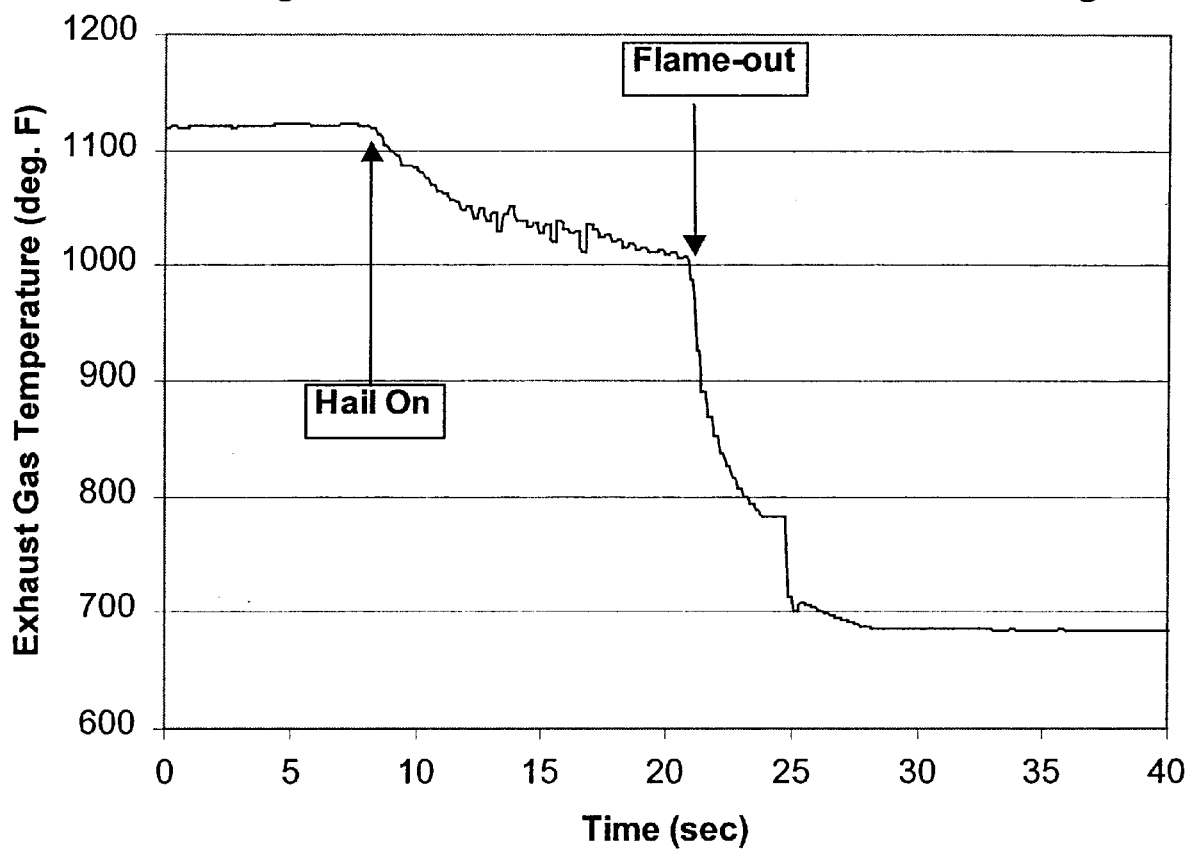
FIG. 3 is an exemplary plot of exhaust gas temperature during a hail ingestion event which results in a flame-out.
Figure 4:
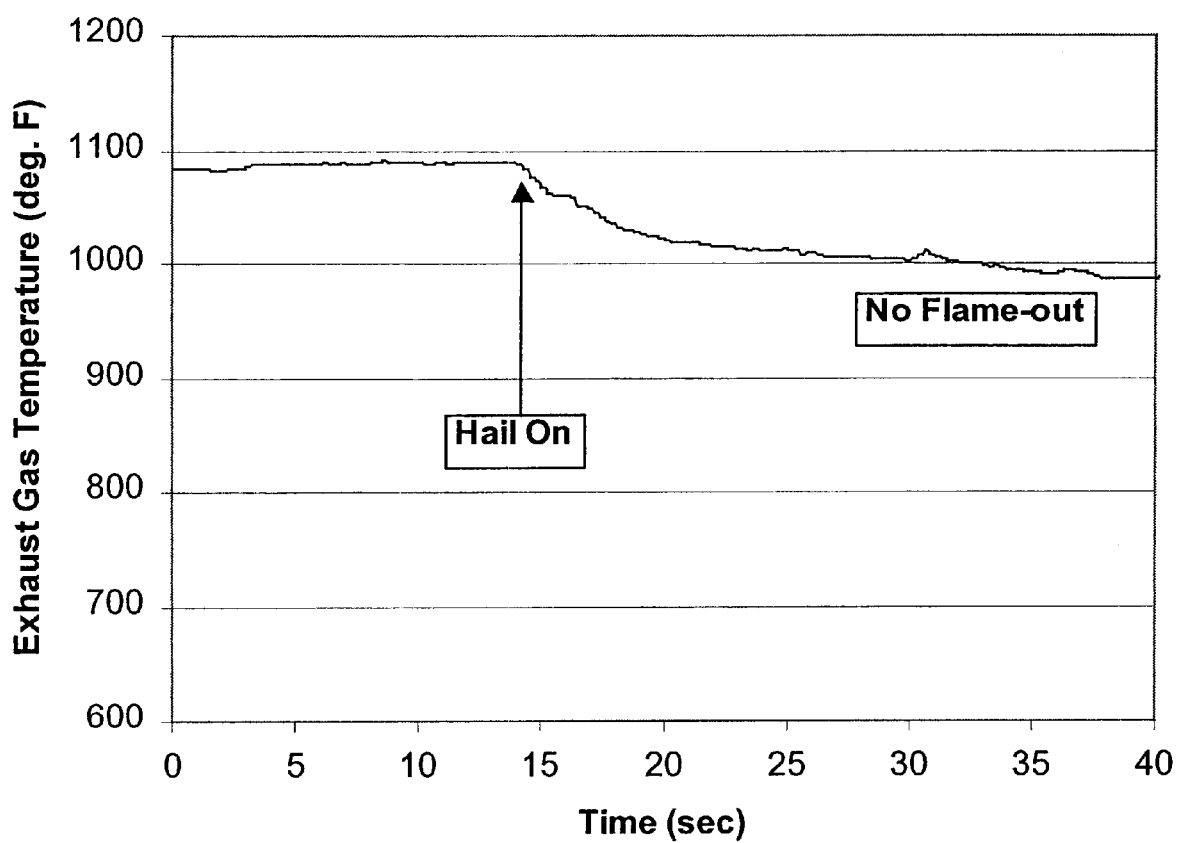
FIG. 4 is an exemplary plot of exhaust gas temperature during a hail ingestion event which does not result in a flame-out.

FIG. 3 is an exemplary plot of exhaust gas temperature during a hail ingestion event which results in a combustor flame-out. FIG. 4 is an exemplary plot of exhaust gas temperature during a hail ingestion event which does not result in a flame-out as a result of fuel control system 40. In the tests shown in FIGS. 3 and 4, the combustor was operable in one of two staging modes. In the first mode, the combustor was operated in high power operating conditions, and conditions in which enhanced combuster flame-out margin is not required. During such modes of operation, the combustor mixes fuel with and burns approximately 100% of the air entering the combustor. FIG. 3 illustrates that at a particular engine operating condition, approximating idle descent conditions, the combustor flames-out when hail is ingested by the engine.

In the second mode, the combustor was operated at low power conditions, and conditions in which enhanced combustor flame-out margin is required. During such operating conditions, system 40 mixes fuel with and burns only approximately 20% of the air entering the combustor. FIG. 4 shows that at during the same operating conditions, the combustor does not flame-out when hail is ingested.

The above-described fuel control system is cost-effective and highly reliable. The system receives input from a plurality of engine sensors coupled to the engine and from an environmental sensor indicating engine operation within hail conditions. The system determines a commanded fuel flow and combustor fuel staging in response to such inputs, and as a result, a controlled variable is selected from a schedule memory storing a predicted fuel flows, in response to input from environmental sensors coupled to the engine. As a result, the fuel control system facilitates enhanced combustor flameout margin when the engine is operating with hail ingestion, and when a reduced fuel schedule is used with the engine.

While the invention has been described in terms of various specific embodiments, those skilled in the art will recognize that the invention can be practiced with modification within the spirit and scope of the claims.

What is claimed is:

1. A control system for controlling an aircraft engine including a combustor, said control system coupled to the aircraft engine for receiving a plurality of reference inputs from engine sensors coupled to the engine, including at least one input indicative of engine environmental operating conditions, said control system configured to produce a commanded fuel flow in response to engine environmental operating conditions and the engine sensor values, said control system further configured to predicate a fuel-air-ratio at which the combustor will flame-out based on current actual operating conditions.

2. A control system in accordance with claim 1 wherein said control system further configured to produce a commanded fuel flow to facilitate reducing combustor flame-outs.

3. A control system in accordance with claim 1 wherein said control system further configured to alter combustor operation in response to the predicted fuel-air-ratio determination.

4. A control system in accordance with claim 1 wherein said control system further configured to enrich combustor fuel operations in response to the predicted fuel-air-ratio determination.

5. A control system in accordance with claim 1 wherein the engine has a pre-determined idle operating speed, said control system further configured to facilitate operating the engine with a reduced pre-determined engine idle speed.

6. A control system in accordance with claim 1 wherein said control system further configured to receive at least one of a compressor discharge pressure, a corrected core speed, and a compressor inlet temperature from the engine.

7. An aircraft engine fuel control system, said system coupled to the aircraft engine to receive reference inputs from the engine to determine a state of the aircraft engine including at least one input indicative of engine hail ingestion, said system configured to enrich combustor fuel operations in response to engine hail ingestion and the engine sensor values, said fuel control system further configured to predicate a fuel-air-ratio at which the combustor will flame-out based on current actual operating conditions.

8. An aircraft engine fuel control system in accordance with claim 7 wherein said system further configured to generate a commanded fuel flow for facilitating reducing engine combustor flameouts.

9. An aircraft engine fuel control system in accordance with claim 8 wherein said system further configured to increase fuel enrichment to the gas turbine engine in response to the predicted fuel-air-ratio.

10. An aircraft engine fuel control system in accordance with claim 8 wherein the engine has a pre-determined idle operating speed, said control system further configured to facilitate operation of the engine with a reduced pre-determined engine idle speed.

11. An aircraft engine fuel control system in accordance with claim 8 wherein said control system further configured to receive at least one of a compressor discharge pressure, a corrected core speed, and a compressor inlet temperature from the engine.

12. An aircraft engine fuel control system in accordance with claim 8 wherein said system further configured to control combustor fuel staging in response to the predicted fuel-air-ratio.

* * * * *